(12) United States Patent
Doumuki (10) Patent No.: US 6,470,122 B1
(45) Date of Patent: Oct. 22, 2002

(54) OPTICAL COHERENCE REDUCTION METHOD AND DEVICE, ILLUMINATING METHOD AND SYSTEM

(75) Inventor: Tohru Doumuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/311,035

(22) Filed: May 13, 1999

(30) Foreign Application Priority Data

May 20, 1998 (JP) ............................................. 10-137823

(51) Int. Cl.$^7$ ............................. G02B 6/04; G02B 6/06; G02B 27/10
(52) U.S. Cl. ...................... 385/115; 385/116; 359/618
(58) Field of Search .................... 385/115, 116, 385/119; 362/552, 553, 554, 268; 359/109, 850, 618; 372/23, 26, 33, 700

(56) References Cited

U.S. PATENT DOCUMENTS

| | | | |
|---|---|---|---|
| 4,851,978 A | * 7/1989 | Ichichara | ..................... 362/268 |
| 4,974,919 A | * 12/1990 | Muraki et al. | ................ 350/6.6 |
| 5,029,975 A | * 7/1991 | Pease | ....................... 350/96.27 |
| 5,272,473 A | * 12/1993 | Thompson et al. | ............ 345/7 |
| 5,343,489 A | * 8/1994 | Wangler | ....................... 372/93 |
| 5,581,348 A | * 12/1996 | Miura et al. | ................ 356/237 |
| 5,662,410 A | * 9/1997 | Suganuma | .................. 362/268 |
| 6,347,173 B1 | * 2/2002 | Suganuma et al. | ......... 359/618 |
| 6,369,888 B1 | * 4/2002 | Karpol et al. | ............ 356/237.4 |

FOREIGN PATENT DOCUMENTS

| | | | | |
|---|---|---|---|---|
| EP | 0869589 A2 | 10/1998 | ............. | H01S/3/00 |
| WO | 95/20811 | 8/1995 | ............ | G09G/3/22 |

OTHER PUBLICATIONS

Jeff Hecht, Understanding Fiber Optics, 2nd edition, 1993, USPTO, pp. 106–109.*
Patent Abstracts of Japan, JP 61–177422, Published Aug. 9, 1986, Canon Inc.
B. Dingel et al., "Speckle Reduction with Virtual Incoherent Laser Illumination Using a Modified Fiber Array," Optik, 94, No. 3, Sep. 1993, pp. 132–136.

* cited by examiner

Primary Examiner—Hemang Sanghavi
Assistant Examiner—Omar Rojas
(74) Attorney, Agent, or Firm—Oblon, Spivak, McClelland, Maier & Neustadt, P.C.

(57) ABSTRACT

In order to reduce coherence without having to apply a large optical path length difference which would exceed coherence length between each of plural branched light beams when the coherence of a coherent beam is being reduced, a multimode laser beam which can be oscillated at plural different wavelengths is provided as the beam to be branched into the plural branched beams. Each of these plural branched beams receives an optical path length difference L that meets the following mathematical expression:

$$c[(n-1)\tau_d+\tau_t/2] \leq L \leq c[n\tau_d\tau_t/2]$$

where c indicates light velocity in a medium in which the light is propagated and n denotes an arbitrary natural number. Instead of a multimode semiconductor laser, a unimode semiconductor laser can be used if that unimode semiconductor laser is driven by a current that has superposed thereon a high frequency oscillation.

12 Claims, 4 Drawing Sheets

FREQUENCY

FIG. 5

LENGTH [mm]

FIG. 6

INJECTED CURRENT WITH SUPERPOSED HIGH FREQUENCY

OPTICAL COHERENCE REDUCTION METHOD AND DEVICE, ILLUMINATING METHOD AND SYSTEM

BACKGROUND OF THE INVENTION

1. Field of the Invention

The present invention relates to an optical coherence reduction method for reducing the coherence of a light beam and its device, an illuminating method in which a light beam the coherence of which is reduced is used and its system.

2. Description of the Related Art

A laser beam is applied to a light source for an image display, a light source for illumination for a semiconductor exposure-system and others. In these examples, the characteristics of a laser beam or coherent light such as high intensity, directivity and monochromaticity are used as advantages, however, in the meantime, a problem peculiar to coherent light such as a speckle (speckle noise) occurs and prevents the application.

Next, the above problem of a speckle will be described.

Figure 8:
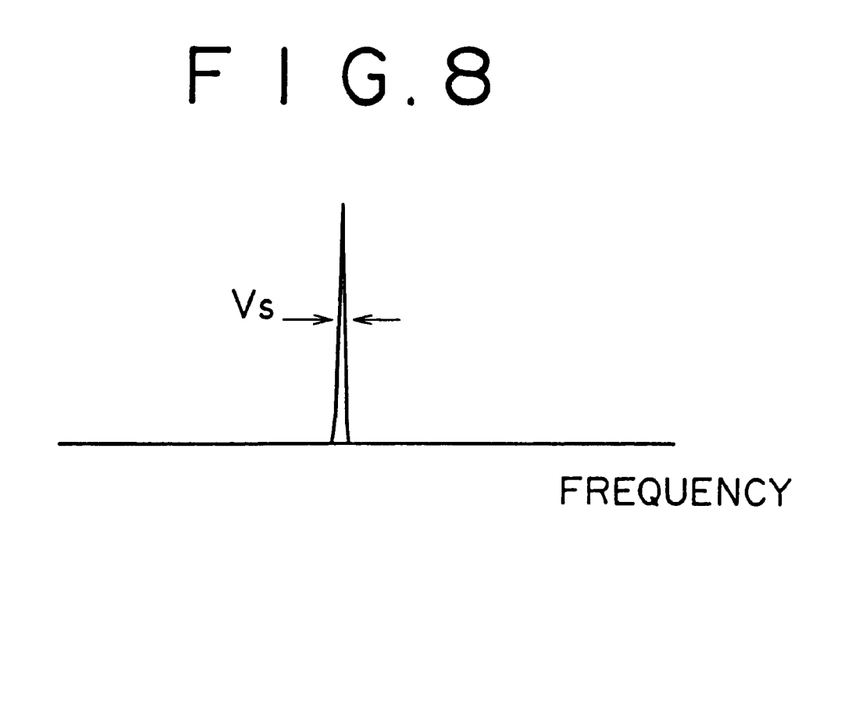
FIG. 8 is a schematic drawing showing the power spectrum of a single mode laser.
Figure 9:
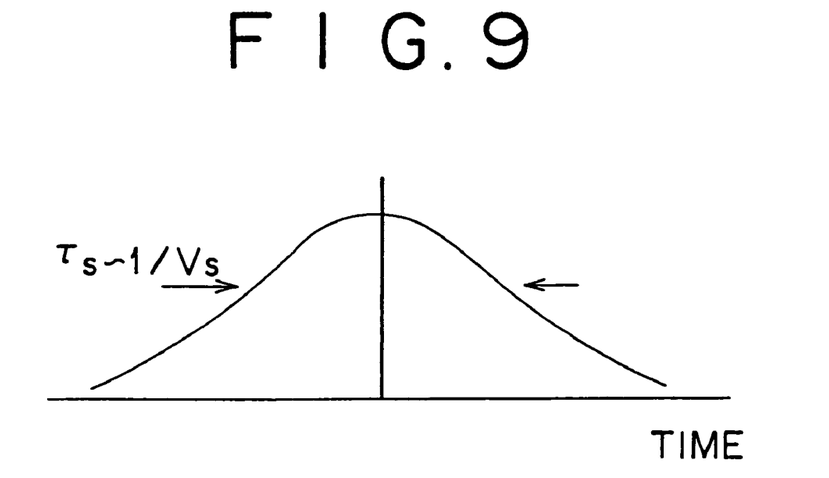
FIG. 9 is a schematic drawing showing the degree of coherence of the single mode laser.

Generally, as shown in FIG. 8, when a laser beam has a unimodal power spectrum, that is, if the degree of coherence of a single mode laser beam is lg ($\tau$) l, lg ($\tau$) l becomes the following expression by Fourier transform G ($\tau$) of the power spectrum and the degree of coherence is shown in FIG. 9. (As described above, a laser oscillated at a single frequency or a single wavelength is called a longitudinal single mode laser.)

$$lg(\tau)l \approx lG(\tau)l/lG(0)l$$

If the full width at a half maximum (the spectral band width) of the unimodal power spectrum shown in FIG. 8 is $v_s$, the full width at a half maximum $\tau_s$ of the degree of coherence shown in FIG. 9 approximately becomes $1/v_s$ though the above full width at a half maximum also depends upon the function of the power spectrum.

"$\tau_s$" and "$L_c$" ("$L_c = c\tau_s$: c" shows light velocity in a medium at which light is propagated) are respectively called coherence time $\tau_s$ and coherence length $L_c$. That is, for example, a coherent luminous flux emitted from a coherent light source is branched into two and one optical path length is made longer by length L than the other optical path length. At this time, if the optical path length difference L is equal or smaller to/than coherence length $L_c$, these branched two beams have a large degree of coherence and mutually interfere. In the meantime, if the optical path length difference L is equal or larger to/than coherence length $L_c$, the two branched beams are mutually incoherent and no interference is caused between these two beams.

It is conceivable that when such a laser beam source is used for a light source for illumination of an image display for example, contribution from an object surface, for example each point and each area of a screen is collected and an image is formed on an image surface, for example on a retina of an observer.

At this time, as it is natural that there are irregularities equal to or large than a wavelength in depth on the object surface (for example, the screen), luminous fluxes having complicated phase relationship are overlapped on the image surface and if their fluxes are mutually coherent, they interfere as a result and a complicated contrastive pattern is formed. This is a speckle (or speckle noise) and in the case of a display, an image is remarkably impaired.

Therefore, to reduce a speckle, it is important to make a coherent luminous flux emitted from a coherent light source mutually incoherent.

For a first method to reduce a speckle, it is conceivable that the spectral band width of a light source is sufficiently widened, that is, coherence length is sufficiently reduced. However, as this method sacrifices the original characteristic of a laser beam, high monochromaticity, it is generally not desirable.

A second method is a method of merging again after coherent light emitted from a light source provided with coherence length to some extent is branched into multiple luminous fluxes and optical path length difference larger than approximately coherence length is given between each other. Hereby, as each luminous flux becomes incoherent, the degree of spatial coherence of merged laser beams can be reduced as the branch of luminous fluxes is increased.

For a device for realizing the second method, bundled fibers or an optical fiber bundle are/is known. In the bundled fibers, plural optical fibers are bundled and optical path length difference longer than the coherence length of an incident light beam is applied to the length of each optical fiber. Both ends of an optical fiber bundle are respectively arranged and a laser beam is incident from one end. Then, at the other end, outgoing laser beams from the respective optical fibers mutually become incoherent and the whole spatial coherence is decreased. Therefore, if such a beam is used for a light source for illumination, a speckle can be reduced.

However, to reduce a speckle of a single mode laser beam emitted from a laser beam source (a longitudinal single mode laser beam source) which oscillates a unimodal power spectrum shown in FIG. 8 using bundled fibers (an optical fiber bundle), there are some problems.

For example, if a semiconductor laser which oscillates in a longitudinal single mode is used for a light source, its typical spectral band width $v_s$ is approximately 100 MHz and therefore, its coherence length $L_c$ is approximately 3 m. If 31 optical fibers are bundled and optical path length difference between each fiber is 3 m, difference in length between the shortest optical fiber and the longest optical fiber is 90 m.

Also, for example, as spectral band width $v_s$ is approximately 1 MHz if a light source is a helium-neon laser which oscillates in a longitudinal single mode, coherence length $L_c$ is approximately 300 m and it is not realistic to generate such long optical path difference even if an optical fiber is used. That is, actually, the volume of a device is large as a whole.

As described above, to sufficiently reduce the degree of coherence of a laser beam in a single mode, after a laser beam in a single mode is branched into plural, optical path length difference exceeding coherence length is required to be applied every laser beam and heretofore, a small-sized and light optical device which can afford such optical path length difference is not obtained.

SUMMARY OF THE INVENTION

The object of the present invention is to provide an optical coherence reduction method and its device wherein coherence can be sufficiently reduced without applying optical path length difference exceeding coherence length to a branched light beam when the coherence of a coherent light beam is reduced.

Further, another object of the present invention is to provide an illuminating method and its system for utilizing a light beam the coherence of which is sufficiently reduced according to the above optical coherence reduction method for a light beam for illumination.

That is, the present invention relates to an optical coherence reduction method (hereinafter, called a coherence reduction method according to the present invention) wherein plural light beams are condensed in a single luminous flux or collected luminous fluxes after a light beam oscillated at plural different wavelengths is branched into plural and fixed optical path length difference is applied between the branched plural light beams.

According to a coherence reduction method according to the present invention, as plural light beams are condensed in a single luminous flux or collected luminous fluxes (that is, utilized as a luminous flux from a single light source as a whole) after a light beam (for example, a longitudinal multimode laser beam) oscillated at plural different frequencies (or wavelengths) is branched into plural and fixed optical path length difference is applied between the branched plural light beams, coherence can be sufficiently reduced without applying optical path length difference exceeding coherence length to the branched light beam.

The degree of coherence of a light beam oscillated at plural different frequencies periodically has a maximum value as the function of distance in case the oscillated frequency has periodicity. Therefore, if a light beam (a luminous flux) oscillated at plural different frequencies is branched into plural and fixed optical path length difference is applied to the branched each luminous flux to be a single luminous flux or collected luminous fluxes, spatial coherence can be sufficiently reduced even if the difference does not necessarily exceed coherence length unless the above fixed optical path length difference is equal to the maximum value of the degree of coherence.

Also, the present invention provides an optical coherence reduction device (hereinafter, called a coherence reduction device according to the present invention) wherein after a light beam oscillated at plural different wavelengths is branched into plural and fixed optical path length difference is applied between the branched plural light beams, plural light beams are condensed in a single luminous flux or collected luminous fluxes as a device for executing the coherence reduction method according to the present invention reproducibly.

Further, the present invention relates to an illuminating method (hereinafter, called an illuminating method according to the present invention) wherein after a light beam outgoing from a coherent light source which oscillates at plural different wavelengths is branched into plural and fixed optical path length difference is applied between the branched plural light beams the above plural light beams are condensed in a single luminous flux or collected luminous fluxes and the luminous flux is utilized as a light beam for illumination.

According to the illuminating method according to the present invention, as a coherent light source (for example, a longitudinal multimode laser beam source) which oscillates at plural different periodic frequencies is used for a light source, the degree of coherence of light beams having plural different frequencies outgoing from the light source periodically has a maximum value as the function of distance. Therefore, if a light beam (a luminous flux) oscillated at plural different frequencies outgoing from the coherent light source is branched into plural and fixed optical path length difference is applied to the branched each luminous flux to be a single luminous flux or collected luminous fluxes, spatial coherence can be reduced even if the above fixed optical path length difference does not necessarily exceed coherence length unless the above difference is equal to the maximum value of the degree of coherence.

Also, the present invention provides a luminaire (hereinafter, called a luminaire according to the present invention) provided with a coherent light source which oscillates at plural different wavelengths and optical means for branching a light beam outgoing from the coherent light source into plural and applying fixed optical path length difference between the branched plural light beams wherein the above plural light beams are condensed in a single luminous flux or collected luminous flux and utilized for light beams for illumination as a system for executing the illuminating method according to the present invention reproducibly.

DESCRIPTION OF THE PREFERRED EMBODIMENTS

First, the action of a coherence reduction method and its device respectively according to the present invention, an illuminating method and its system respectively according to the present invention will be described.

Figure 2:
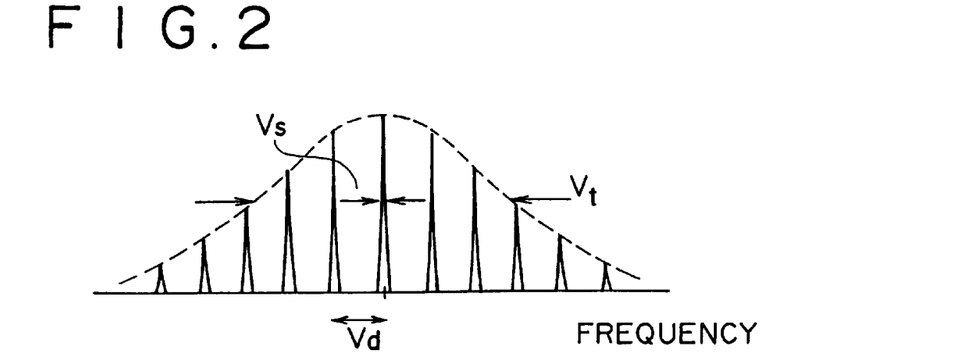
FIG. 2 is a schematic drawing showing the power spectrum of a multimode laser for explaining the action of the present invention.

FIG. 2 is a schematic drawing showing the spectrum of a longitudinal multimode laser.

As described above, if the interval of each mode is $v_d$ and the resonator length of the laser is $L_1$, each mode of the spectrum of a multimode laser beam outgoing from the multimode laser is lined according to the following expression A.

$$v_d = c_0/2nL_1 \qquad \text{Expression A}$$

(However, $c_0$ denotes a luminous flux in vacuum and n denotes the refractive index of a laser medium.)

Figure 3:
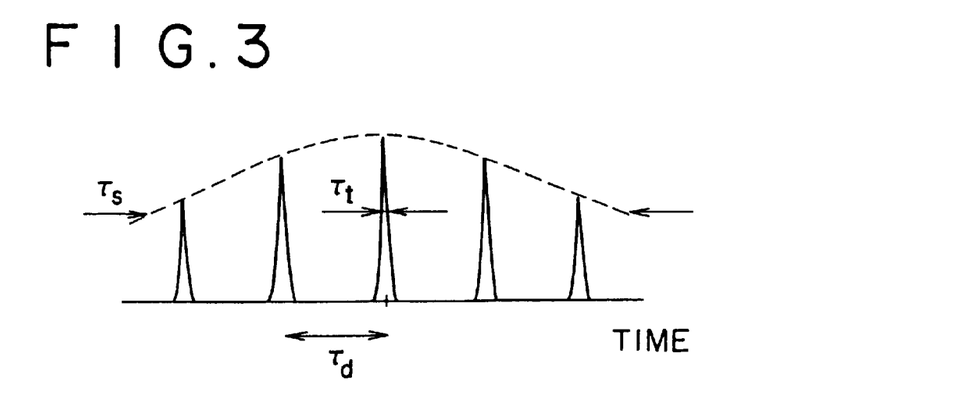
FIG. 3 is a schematic drawing showing the degree of coherence of the multimode laser.

The degree g ($\tau$) of coherence of such a multimode laser beam is schematically shown by Fourier transform in FIG. 3. That is, in the case of the multimode laser, the maximum value of the degree of coherence also periodically emerges because of the periodicity of the spectrum. The full width at a half maximum $\tau_t$ of the waveform of each maximum value is as follows.

$$\tau_t \approx 1/v_t \qquad \text{Expression B}$$

"$v_t$" denotes the full width at a half maximum of the envelope of a power spectrum.

The full width at a half maximum $\tau_t$ of a maximum waveform is generally sufficiently smaller than the coherence time $\tau_s$ ($\tau_s \approx 1/v_s$) in the case of width $v_s$ in a longitudinal mode. It can be also said that generally, as coherence time $\tau_c$ is defined as follows, the full width at a half maximums $\tau_t$ of a maximum waveform is generally smaller than coherence time $\tau_c$.

[Mathematical expression 1]

$$\tau_c = \int_{-\omega}^{\omega} dt |g(t)|^2$$

That is, if the multimode laser is used for a light source, spatial coherence can be sufficiently reduced in case predetermined optical path length difference is applied even if optical path length difference is not as large as coherence time $\tau_c$.

Next, the coherence reduction method and its device respectively according to the present invention will be described.

In the coherence reduction method and its device respectively according to the present invention, it is desirable that each outgoing end of plural light beams is arranged on the same surface or each outgoing beam of plural light beams is again merged.

Although the details are described later, to arrange each outgoing end of plural light beams on the same surface (particularly on the same plane), an optical element shown in FIG. 1 for example has only to be used. The optical element (particularly, a prism and a group of mirrors) is provided with a plane of incidence of light beams and a semi-transparent plane (or a semi-transparent mirror) different from the above plane of incidence, and the above optical element is composed so that fixed optical path length difference is applied to a light beam reflected between the above semi-transparent plane and a reflecting surface (or a total reflection mirror) opposite to the semi-transparent plane and the light beams are sequentially outgoing from the semi-transparent plane (the semi-transparent mirror). Therefore, fixed optical path length difference is generated between light beams (multimode laser beams) oscillated at plural different wavelengths and incident on the above plane of incidence and each outgoing end of these light beams is arranged on the same surface (that is, on the semi-transparent mirror).

Figure 7:
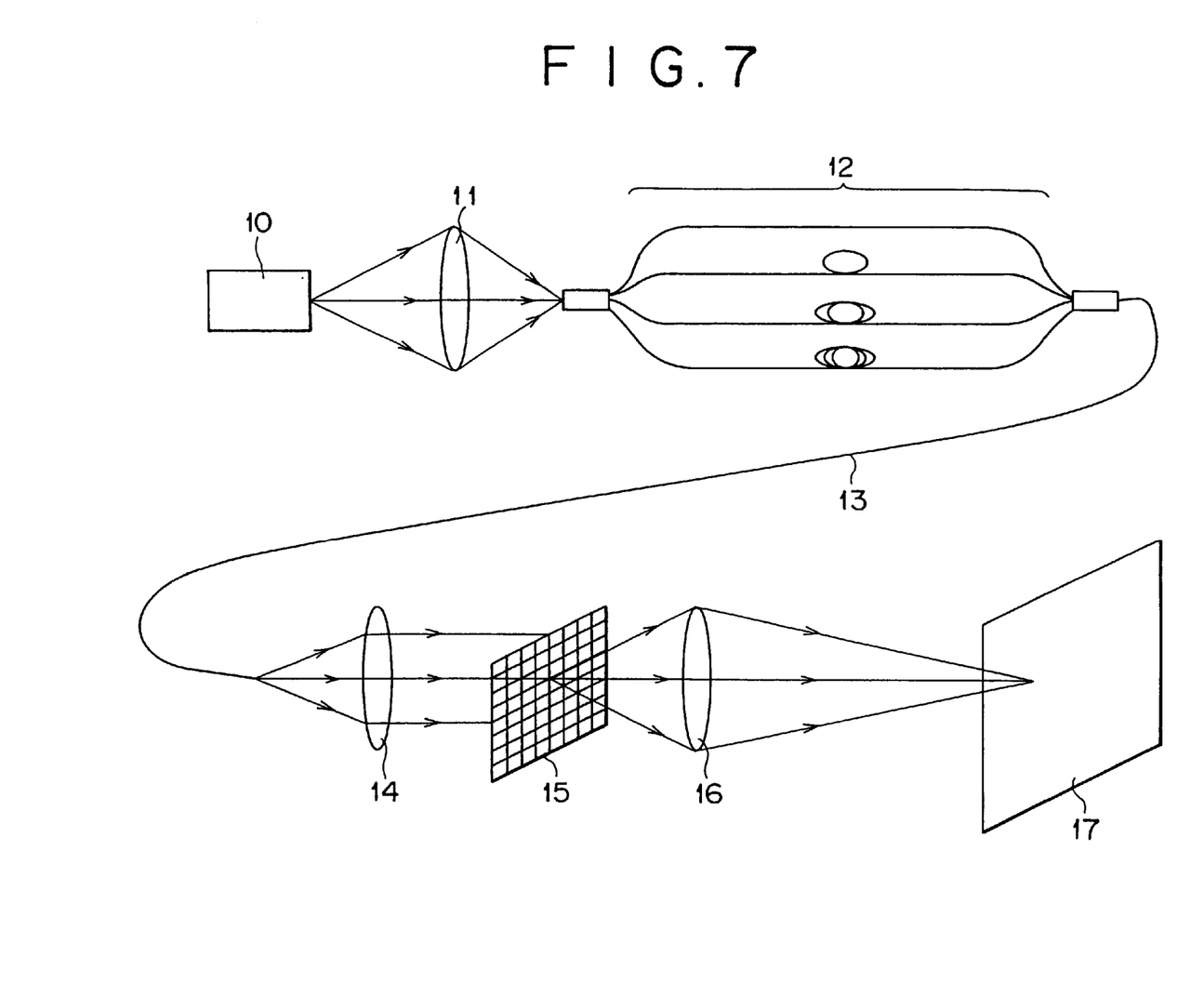
FIG. 7 is a schematic drawing showing the main part of a luminaire equivalent to a second embodiment of the present invention.

Or to merge each outgoing end of plural light beams again, bundled fibers (an optical fiber bundle) shown in FIG. 7 for example has only to be used. In the optical fiber bundle, plural optical fibers different in length to the extent exceeding the above fixed optical path length difference are bundled, and their incident ends and their outgoing ends are respectively arranged. When light beams (multimode laser beams) oscillated at plural different wavelengths are incident on the optical fiber bundle, fixed optical path length difference is generated between the plural light beams and each outgoing end of these light beams is again merged.

As a light beam oscillated at plural different periodic wavelengths (or frequencies) is a light beam the maximum value of the degree of coherence of which has periodicity, spatial coherence can be sufficiently reduced by setting fixed optical path length difference between branched light beams to a value which is not equal to the maximum value of the degree of coherence without setting optical path length difference to approximately coherence time.

If the degree of coherence has a maximum value in a fixed cycle in time when the degree of coherence of the above light beam is expressed as the function of time, the full width at a half maximum of a first maximum waveform is $\tau_t$ and center distance between the first maximum waveform and a second maximum waveform which emerges next to the first maximum waveform is $\tau_d$, it is desirable that the above fixed optical path length difference L meets the following expression 1.

$$c[(n-1)\tau_d + \tau_t/2] \leq L \leq c[n\tau_d - \tau_t/2] \qquad \text{Expression 1}$$

(However, in the above expression 1, c denotes light velocity in a medium in which light is propagated and n denotes an arbitrary natural number.)

That is, as branched luminous fluxes can be considered to be mutually incoherent if the above fixed optical path length difference is L and is set so that the above difference is in a range in which the following expression 1 is met, spatial coherence is effectively reduced in case these luminous fluxes are regarded as a single luminous flux from a light source as a whole.

$$c[(n-1)\tau_d + \tau_t/2] \leq L \leq c[n\tau_d - \tau_t/2] \qquad \text{Expression 1}$$

Also, it is desirable that minimum m is 3 or more if the above fixed optical path length difference is L and the arbitrary natural number times mL (m: arbitrary natural number) of the optical path length difference L and the natural number times of the cycle $c\tau_d$ of a coherence function are equal.

That is, if a luminous flux oscillated from the above longitudinal multimode laser is branched (divided) into three or more optical paths (for example, a first luminous flux, a second luminous flux, a third luminous flux), it is desirable that the following strict design is made. A case that optical path difference $L_a$ between the first luminous flux and the second luminous flux is obtained by the following expression D and further, optical path difference $L_b$ between the second luminous flux and the third luminous flux is also obtained by the following expression E will be described below.

$$L_a = (n-1/2)c\tau_d \qquad \text{Expression D}$$

$$L_b = (n-1/2)c\tau_d \qquad \text{Expression E}$$

In this case, if the above expression 1 is met, the first luminous flux and the second luminous flux, and the second luminous flux and the third luminous flux can be respectively regarded as incoherent and they do not interfere each other. However, optical path difference $L_c$ between the first luminous flux and the third luminous flux is as follows and is equivalent to the natural number times of the cycle $c\tau_d$ of a coherence function.

$$L_c = 2(n-1/2)c\tau_d \qquad \text{Expression F}$$

That is, the first luminous flux and the third luminous flux are coherent and the degree of coherence is increased.

If each optical path difference between the first luminous flux and the second luminous flux and between the second luminous flux and the third luminous flux is set to a value slightly off from $(n-1/2)c\tau_d$ in the vicinity of $(n-1/2)c\tau_d$ as shown in the above expressions D and E, that is, if minimum m when the natural number m times of the optical path difference is equal to the natural number times of the cycle $c\tau_d$ of a coherence function is 3 or more, the ratio of the combination of luminous fluxes respectively having the large degree of coherence can be further reduced and spatial coherence can be more effectively reduced.

Also, it is desirable that the above light beam is a laser beam outgoing from a semiconductor laser which oscillates at plural different wavelengths.

That is, as the cycle $c\tau_d$ of a coherence function is approximately a few mm to at most approximately a few cm if the above longitudinal multimode laser is a semiconductor laser which oscillates at plural different wavelengths, the whole coherence reduction device including a laser beam source and an optical system for generating optical path difference can be sufficiently miniaturized and lightened and is advantageous as a light source for illuminating an object.

Further, it is desirable that a light source for emitting the above light beam is a semiconductor laser and laser beams with plural different wavelength are oscillated from the semiconductor laser by superposing a high-frequency signal on current injected for exciting the semiconductor laser.

That is, when a semiconductor laser is used for the above light source and a high-frequency signal is superposed on current injected for exciting the semiconductor laser, the semiconductor laser can be utilized for the above longitudinal multimode laser because laser beams are oscillated at plural different frequencies (or wavelengths) although a laser normally oscillates beams with a single frequency, and as a result, a choice of usable semiconductor lasers is widened.

Next, an illuminating method and its system respectively according to the present invention will be described.

In the illuminating method and the system according to the present invention, it is desirable that each outgoing end of plural light beams is arranged on the same surface or each outgoing end of plural light beams is again merged.

Figure 1:
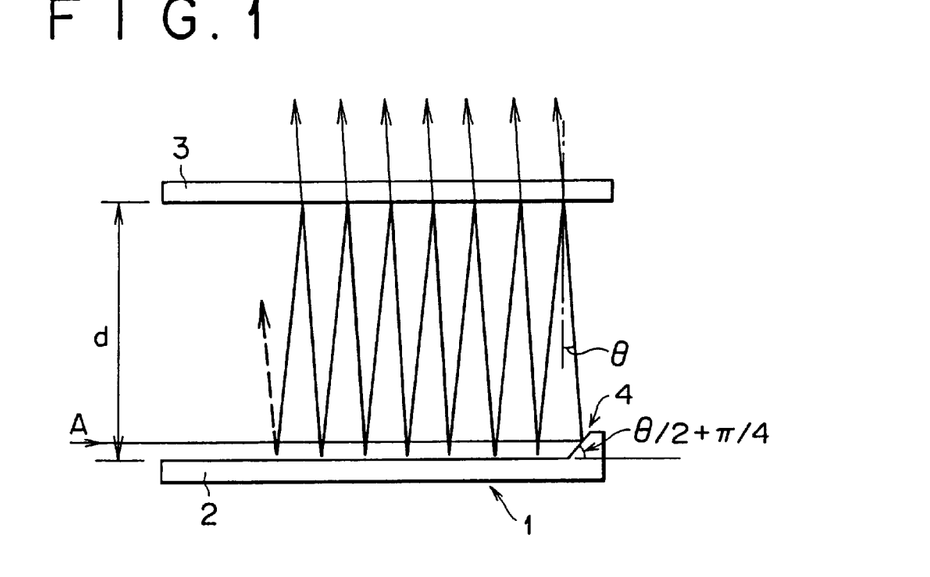
FIG. 1 is a schematic drawing showing the main part of an optical device equivalent to a first embodiment of the present invention.

As the above coherence reduction method and the device according to the present invention, to arrange each outgoing end of plural light beams on the same surface (particularly, on the same plane), for example, an optical element shown in FIG. 1 has only to be used. The above optical element (particularly, a prism or a group of mirrors) is provided with a plane of incidence of a light beam and a semi-transparent plane (or a semi-transparent mirror) different from the plane of incidence, and the optical element is composed so that the above fixed optical path length difference is applied to a light beam reflected between the above semi-transparent plane and a reflecting surface (or a total reflection mirror) opposite to the semi-transparent plane and the light beams are sequentially outgoing from the semi-transparent plane (the semi-transparent mirror). Therefore, the above fixed optical path length difference is generated between light beams (multimode laser beams) oscillated at plural different wavelengths and incident on the plane of incidence and each outgoing end of these light beams is arranged on the same surface (that is, on the semi-transparent mirror).

Or to merge each outgoing end of plural light beams again, for example, bundled fibers (an optical fiber bundle) shown in FIG. 7 has only to be used. In the optical fiber bundle, plural optical fibers having length exceeding the above fixed optical path length difference and mutually different are bundled, and the incident ends and the outgoing ends are respectively arranged. When light beams (multimode laser beams) oscillated at plural different wavelengths are incident on the optical fiber bundle, the above fixed optical path length difference is generated between the plural light beams and each outgoing end of these light beams is again merged.

As the maximum value of the degree of coherence also has periodicity if the wavelength (or the frequency) of a light beam oscillated at plural different wavelengths (or frequencies) has periodicity, spatial coherence can be sufficiently reduced by setting optical path length difference so that it is the above fixed optical path length difference of each branched light beam which is not equal to the maximum value of the degree of coherence without increasing optical path length difference up to approximately coherence time.

If the degree of coherence has a maximum value at a fixed cycle in time when the degree of the coherence of a light beam is expressed as the function of time, the full width at a half maximum of a first maximum waveform is $\tau_t$ and center distance between the first maximum waveform and a second maximum waveform which emerges next to the first maximum waveform is $\tau_d$, it is desirable that the above fixed optical path length difference L meets the following expression 1.

$$c[(n-1)\tau_d+\tau_t/2] \leq L \leq c[n\tau_d-\tau_t/2] \qquad \text{Expression 1}$$

(However, in the above expression 1, c denotes light velocity in a medium in which light is propagated and n denotes an arbitrary natural number.)

That is, as it can be avoided that the maximum values of coherence coincide if the above fixed optical path length difference is L and is set in a range in which the following expression 1 is met as the above coherence reduction method and device according to the present invention, spatial coherence is effectively reduced.

$$c[(n-1)\tau_d+\tau_t/2] \leq L \leq c[n\tau_d-\tau_t/2] \qquad \text{Expression 1}$$

Also, it is desirable that minimum m is 3 or more if the above fixed optical path length difference is L and the arbitrary natural number times mL (m: arbitrary natural number) of the optical path length difference L and the natural number times of the cycle $c\tau_d$ of a coherence function are equal.

That is, if a luminous flux oscillated from the above longitudinal multimode laser is branched (divided) into three or more optical paths (for example, a first luminous flux, a second luminous flux, a third luminous flux) as the above coherence reduction method and device according to the present invention, it is desirable that the following strict design is made. A case that optical path difference $L_2$ between the first luminous flux and the second luminous flux is obtained by the following expression D and further, optical path difference $L_b$ between the second luminous flux and the third luminous flux is also obtained by the following expression E will be described below.

$$L_a=(n-1/2)c\tau_d \qquad \text{Expression D}$$

$$L_b=(n-1/2)c\tau_d \qquad \text{Expression E}$$

In this case, if the above expression 1 is met, the first luminous flux and the second luminous flux, and the second luminous flux and the third luminous flux can be respectively regarded as incoherent and they do not interfere each other. However, optical path difference $L_c$ between the first luminous flux and the third luminous flux is as follows and is equivalent to the natural number times of the cycle $c\tau_d$ of a coherence function.

$$L_c=2(n-1/2)c\tau_d \qquad \text{Expression F}$$

That is, the first luminous flux and the third luminous flux are coherent and the degree of coherence is increased.

If each optical path difference between the first luminous flux and the second luminous flux and between the second luminous flux and the third luminous flux is set to a value slightly off from $(n-1/2)c\tau_d$ in the vicinity of $(n-1/2)c\tau_d$ as shown in the above expressions D and E, that is, if minimum m when the natural number m times of the optical path difference is equal to the natural number times of the cycle $c\tau_d$ of a coherence function is 3 or more, the ratio of the combination of luminous fluxes respectively having the large degree of coherence can be further reduced and spatial coherence can be more effectively reduced.

Also, it is desirable that the above light beam is a laser beam outgoing from a semiconductor laser which oscillates at plural different wavelengths.

That is, as the cycle $c\tau_d$ of a coherence function is approximately a few mm to at most approximately a few cm if the above longitudinal multimode laser is a semiconductor laser which oscillates at plural different wavelengths, the whole coherence reduction device including a laser beam source and an optical system for generating optical path difference can be sufficiently miniaturized and lightened and is advantageous as a light source for illumination.

Further, it is desirable that a light source for emitting the above light beam is a semiconductor laser and laser beams with plural different wavelength are oscillated from the semiconductor laser by superposing a high-frequency signal on current injected for exciting the semiconductor laser.

That is, when a semiconductor laser is used for the above light source and a high-frequency signal is superposed on current injected for exciting the semiconductor laser, the semiconductor laser can be utilized for the above longitudinal multimode laser because laser beams are oscillated at plural different frequencies (or wavelengths) although a laser normally oscillates beams with a single frequency, and as a result, a choice of usable semiconductor laser s is widened.

A light beam for illumination obtained based upon the illuminating method and the luminaire according to the present invention can be utilized for illuminating light for a display, an exposure device, a measuring device or a microscope for example. That is, as the coherence of the above illuminating light beam is sufficiently reduced, it can be utilized for illuminating light the speckle (or speckle noise) of which is reduced.

Next, preferred embodiments of the present invention will be described.

First Embodiment

This embodiment relates to an optical element according to the characteristic configuration of the present invention for branching a multimode laser beam emitted from a semiconductor laser into plural and making a light beam the coherence of which is reduced outgoing by arranging the outgoing end of each light beam on the same surface after fixed optical path length difference is applied to the optical path of each branched light beam.

Figure 4:
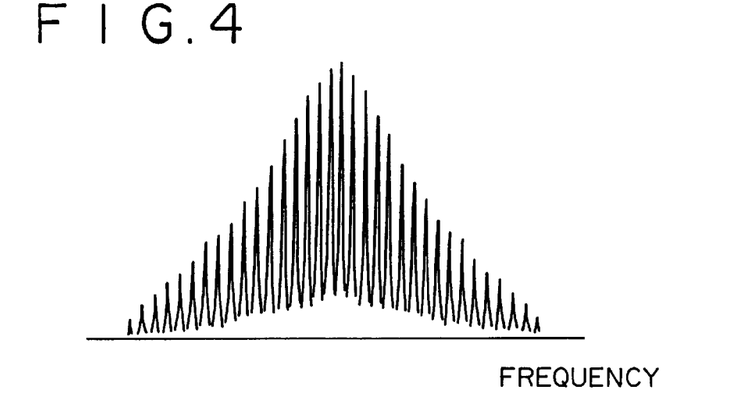
FIG. 4 is another schematic drawing showing the power spectrum of the multimode laser.

First, FIG. 4 schematically shows the power spectrum of a semiconductor laser used for a light source. This is the power spectrum of a semiconductor laser which enters a multimode when a high frequency is superposed and the semiconductor laser itself is general purpose. It is generally known that when a high-frequency signal is superposed on the input current of a semiconductor laser in a longitudinal signal mode, the semiconductor laser enters a longitudinal multimode shown in FIG. 4.

Figure 5:
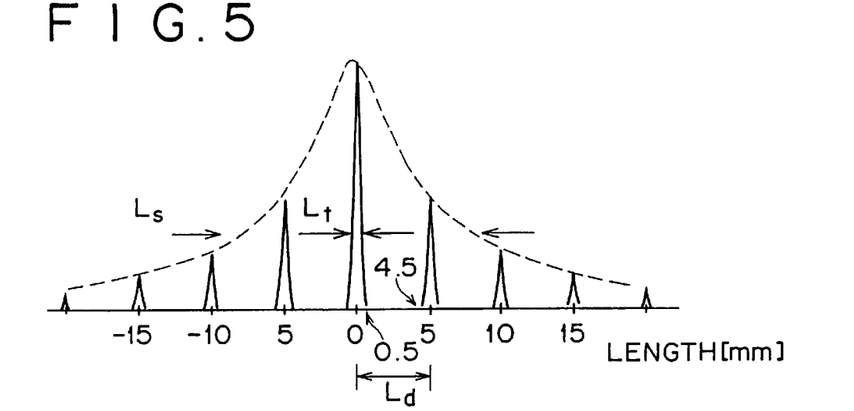
FIG. 5 is the other schematic drawing showing the degree of coherence of the multimode laser.

Also, the degree of coherence of the semiconductor laser can be acquired by using the Fourier transform of the power spectrum shown in FIG. 4. FIG. 5 shows the degree of coherence acquired by multiplying the degree of coherence as the function of time acquired by using the Fourier transform of the power spectrum shown in FIG. 4 by light velocity c as the function of distance.

As shown in FIG. 5, in this example, when optical path length difference is approximately 0.5 mm, coherence between luminous fluxes decreases and is kept approximately zero until optical path length difference increases up to 4.5 mm again. However, when optical path length difference is 5 mm, the degree of coherence becomes maximum again and afterward, when optical path length difference is 10 mm, 15 mm and so on, a maximum value periodically emerges. However, the maximum value is gradually greatly attenuated.

Next, FIG. 1 shows the optical element equivalent to this embodiment. That is, according to this optical element, spatial coherence can be reduced by making a laser beam in a longitudinal multimode emitted from a longitudinal multimode laser beam source incident, branching it into plural optical paths and applying fixed optical path length difference to each as described above.

The above optical element (prism) will be detailedly described below.

The optical element shown in FIG. 1 is equivalent to a prism composed of mirrors arranged opposite at a fixed interval. That is, a total reflection mirror 2 is arranged in parallel with a laser beam in a longitudinal multimode incident on the prism 1 and a part 4 of the total reflection mirror arranged at a predetermined angle with the mirror surface of the total reflection mirror 2 is provided in a part of the total reflection mirror 2.

A partial transparent mirror (a half mirror or a semi-transparent mirror) 3 is arranged opposite to the total reflection mirror 2 and the partial transparent mirror 3 is provided with a character that light beams equivalent to 10% are transmitted and light beams equivalent to 90% are reflected for example. The total reflection mirror 2 and the partial transparent mirror 3 are arranged opposite in parallel apart by distance d.

A light beam A incident on the prism 1 composed of the total reflection mirror 2, the part 4 of the total reflection mirror and the partial transparent mirror 3 is first reflected by the part 4 of the total reflection mirror and guided to the semi-transparent mirror 3. If the inclination of the mirror surface of the total reflection mirror 2 is $\theta/2+\pi/4$ as shown in FIG. 1, a light beam reflected by the total reflection mirror 4 is incident on the semi-transparent mirror 3 at an angle $\theta$.

If the semi-transparent mirror 3 is set so that it has a character that light beams equivalent to 10% are transmitted and light beams equivalent to 90% are reflected, 10% of the total quantity of the light beams is transmitted, however, 90% is reflected, again reaches the total reflection mirror 2 and further, light beams reflected at the angle $\theta$ by the total reflection mirror 2 again reach the semi-transparent mirror 3 (make a round trip). As described above, a light beam advances, repeating reflection by the total reflection mirror 2, reflection and transmission by the semi-transparent mirror 3 (that is, a light beam makes round trips between the total reflection mirror 2 and the semi-transparent mirror 3 and advances, being attenuated).

Therefore, when viewed from the side of the upper surface of the semi-transparent mirror 3, light beams to which optical path length difference is respectively applied by $2d/\cos\theta$ are outgoing with them arranged.

The above optical path length difference $2d/\cos\theta$ has only to be optical path length difference that the degree of coherence of each branched light beam is not equal to a maximum value and if the degree of coherence of a light beam outgoing from a laser beam source is expressed as the function of time, the full width at a half maximum of a first maximum waveform which emerges as the degree of coherence is $\tau_t$ and center distance between the above first maximum waveform and a second maximum waveform which emerges next to the first maximum waveform is $\tau_d$ as described above, the above optical path length difference L is acquired in the following expression.

$$c[(n-1)\tau_d+\tau_t/2] \leq L \leq c[n\tau_d-\tau_t/2] \qquad \text{Expression 1}$$

(However, in the above expression 1, c denotes light velocity in a medium in which light is propagated and n denotes an arbitrary natural number.)

Figure 6:
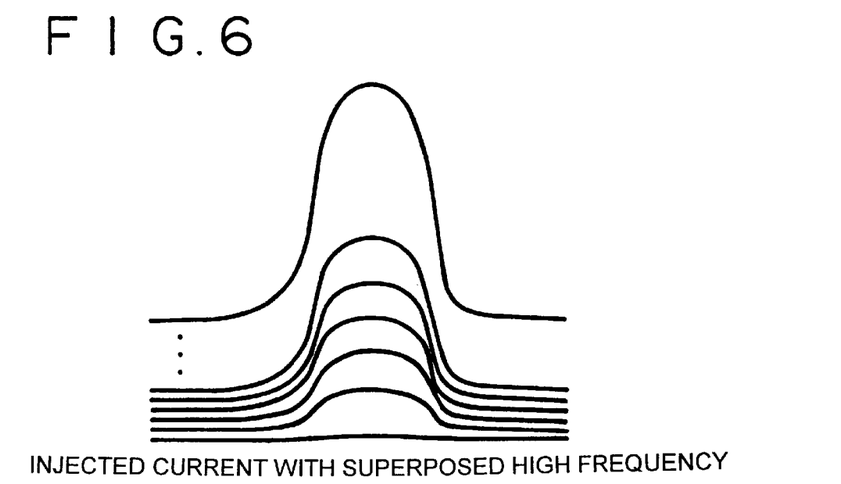
FIG. 6 is a schematic drawing showing injected current on which a high frequency is superposed and which is supplied to a semiconductor laser to oscillate the multimode laser.

Suppose that the above optical path length difference L is 9 mm. Then, as known from FIG. 5, in this case, coherence between a certain transmitted luminous flux from the semitransparent mirror 3 and an outgoing luminous flux to which each optical path length difference equivalent to one to four round trips, that is, of 9 mm, 18 mm, 27 mm and 36 mm from the above transmitted luminous flux in the prism is applied is approximately zero. Coherence between luminous fluxes between which the optical path length difference equivalent to five round trips, that is, of 45 mm is applied becomes maximum, however, in a semiconductor laser on which a high-frequency signal shown in FIG. 6 is superposed, the full width at a half maximum $L_s$ of an envelope showing the degree of coherence is generally approximately 20 cm, the degree of coherence between luminous fluxes between which the optical path length difference of 45 mm is generated is sufficiently reduced and is insignificant. That is, the maximum value of the degree of coherence can be considered to be not substantially coincident.

This is because the full width at a half maximum of each mode of the power spectrum of a laser beam on which a high-frequency signal is superposed is larger than the full width at a half maximum of the power spectrum in case no high-frequency signal is superposed and a laser beam is oscillated at a single frequency. That is, considering that the coherence length of a laser beam emitted from a semiconductor laser which oscillates in a single mode in which no high-frequency signal is superposed is generally approximately 3 m, the volume of the optical element (the prism) can be reduced to the extent that 2d/cos θ is 9 mm for example by superposing a high-frequency signal and the optical element is extremely advantageous when it is utilized for a light source for illumination.

Second Embodiment

Referring to FIG. 7, a second embodiment of the present invention will be described below.

This embodiment relates to an optical device (display) which uses a multimode laser beam source (a coherent light source) 10, makes a light beam outgoing from the above laser beam source 10 and respectively having a different wavelength incident on bundled fibers (an optical fiber bundle) 12, branches it into plural, makes the light beam the coherence of which is reduced outgoing by arranging the outgoing end of each optical fiber 12 and merging it again after fixed optical path length difference is applied to each optical fiber functioning as the optical path of each branched light beam and utilizes the light beam for a light beam for illumination.

In the above display, first, a multimode laser beam outgoing from the multimode laser beam source (the coherent beam source) 10 is incident on a lens 11 and next, the laser beam focused by the lens 11 is incident on the bundled fibers (the optical fiber bundle) 12.

The optical path length difference L of each optical fiber in the bundled fibers 12 is optical path length difference that the degree of coherence is not equal to a maximum value as in the first embodiment. Concretely, if the degree of coherence of a light beam outgoing from the laser beam source is expressed as the function of time, the full width at a half maximum of a first maximum waveform which emerges as the degree of coherence is $\tau_t$ and center distance between the above first maximum waveform and a second maximum waveform which emerges next to the first maximum waveform is $\tau_d$, the above optical path length difference L is acquired in the following expression.

$$c[(n-1)\tau_d+\tau_t/2] \leq L \leq c[n\tau_d-\tau_t/2] \qquad \text{Expression 1}$$

(However, in the above expression 1, c denotes light velocity in a medium in which light is propagated and n denotes an arbitrary natural number.) The above optical path length difference L may be 9 mm for example as in the first embodiment.

Therefore, a laser beam which passes the bundled fibers 12 becomes a laser beam the coherence of which is sufficiently reduced. A laser beam which passes the bundled fibers 12 and an optical fiber 13 irradiates a spatial light modulator (a light bulb) 15 composed of transmission type liquid crystal display elements through a lens 14. Next, a predetermined image by the spatial light modulator 15 is projected on a screen 17 via a lens 16. However, a laser beam outgoing from the bundled fibers 12 may be also utilized for a light beam for illumination as it is without passing the optical fiber 13.

According to this embodiment, as a laser beam provided with high intensity, high directivity and monochromaticity is utilized for a light beam for illumination, an image having high luminance can be projected and simultaneously, as a multimode laser beam as a light beam for illumination is outgoing from the above bundled fibers, the coherence is sufficiently reduced, therefore, speckle noise is reduced and a high definition image is acquired.

The modulator for displaying an image in this embodiment is not limited to the above spatial light modulator, for example, it may be also a reflection type spatial light modulator and a digital micro mirror device and others may be also used.

As described above, according to the optical device (or the optical element) equivalent to this embodiment, the following effect is produced.

(1) As a multimode laser which oscillates plural different frequencies is used for a light source, coherence can be sufficiently reduced even if optical path length difference shorter than coherence length is applied if the optical device is designed so that the optical path length difference is set to a value except a maximum value utilizing the periodicity of the degree of coherence.

(2) Also, if a semiconductor laser which oscillates a multimode laser beam is used for a light source, not only the light source can be miniaturized but an optical system for generating predetermined optical path length difference can be miniaturized because the periodicity of the degree of coherence is approximately a few mm to at most a few cm.

(3) Further, as even a laser oscillated at a single frequency (in a single mode) generally enters a multimode if a semiconductor laser is used for a light source and a high frequency is superposed on input current for exciting the semiconductor laser, the semiconductor laser can be utilized for the light source according to the present invention and a choice of laser beam sources (particularly, semiconductor lasers) can be widened.

The preferred embodiments of the present invention are described above, however, the present invention is not limited to these embodiments.

For example, for the light source, there are various choices except superposing a high-frequency signal on current to be injected into a semiconductor laser as described above. That is, a laser originally oscillated at plural frequencies may be also used and as a semiconductor laser which is a so-called free-running oscillator also behaves as a longitudinal multimode laser, the similar effect can be obtained. If a laser beam is utilized for a light beam for illumination, a longitudinal multimode is generally hardly put in question.

An optical system for generating optical path length difference according to the characteristic configuration of the present invention is not limited to the prism shown in FIG. 1 and various embodiments are allowed.

For example, after a light beam is made incident on a transparent prism and reflected inside it, a part of light beams the reflection of each of which is repeated may be also sequentially made outgoing from one surface of the prism. In addition, if an optical system such as bundled fibers and prisms in various shapes has only to be an optical system which branches a luminous flux and generates fixed optical path length difference, the similar effect can be obtained. Particularly, such an optical system may be also an optical system provided with the similar action to the above prism and composed of a group of mirrors composed of the surface on which a light beam is incident (however, this surface may be also omitted), a semi-transparent mirror (a partial transparent mirror) different from the surface of incidence and a reflecting mirror (a total reflection mirror) arranged opposite to the semi-transparent mirror, that is, may be also a group of mirrors composed so that fixed optical path length difference is applied to a light beam which repeats reflection between the above semi-transparent mirror and the above total reflection mirror and is sequentially outgoing from the semi-transparent mirror.

The present invention is not limited to the display as described above and in addition, various applications to a measuring device for illuminating an object to be measured, utilizing spectral characteristics such as its reflectance and transmissivity, an exposure device for which high intensity and a shorter wavelength are required and a fluorescence microscope and others are conceivable.

Further, an image display using such a prism as described in the first embodiment wherein a spatial light modulator is arranged on the surface from which multiple parallel luminous fluxes are outgoing and the above parallel luminous fluxes are modulated hereby and others can be also composed. Particularly, according to the optical device described in the first embodiment, as a two-dimensional luminous flux is outgoing, it is desirable that the luminous flux is effectively utilized.

According to the optical coherence reduction method according to the present invention, as plural light beams are converged in a single luminous flux or collected luminous fluxes after a light beam oscillated at plural different wavelengths is branched into plural and fixed optical path length difference is applied between these branched plural light beams, coherence can be sufficiently reduced without applying optical path length difference exceeding coherence length between the branched light beams.

The degree of coherence of a light beam oscillated at plural frequencies periodically has a maximum value as the function of distance and even if optical path length difference does not necessarily exceed coherence length if the fixed optical path length difference is not equal to the maximum value of the degree of coherence, spatial coherence can be sufficiently reduced.

According to the coherence reduction device according to the present invention, as plural light beams are converged in single luminous flux or collected luminous fluxes after a light beam oscillated at plural different wavelengths is branched into plural and fixed optical path length difference is applied between these branched plural light beams, the coherence reduction method according to the present invention can be reproducibly executed and simultaneously, the compact and light coherence reduction device can be realized.

According to the illuminating method according to the present invention, as plural light beams are converged in a single luminous flux or collected luminous fluxes and the luminous flux is utilized for a light beam for illumination after a light beam outgoing from the coherent beam source which oscillates at plural different wavelengths is branched into plural and fixed optical path length difference is applied between these branched plural light beams, coherence can be sufficiently reduced without applying optical path length difference exceeding coherence length to the branched light beam and illuminating light the speckle noise of which is reduced can be generated.

As the degree of coherence of a light beam oscillated at plural frequencies periodically has a maximum value as the function of distance, spatial coherence can be reduced even if optical path length difference does not necessarily exceed coherence length if the fixed optical path length difference is not equal to the maximum value of the degree of coherence.

According to the luminaire according to the present invention, as the coherent beam source which oscillates at plural different wavelengths and optical means for branching a light beam outgoing from the coherent beam source into plural and applying fixed optical path length difference between the branched plural light beams are provided, the above plural light beams are converged in a single luminous flux or collected luminous fluxes and can be utilized for a light beam for illumination, the illuminating method according to the present invention can be reproducibly executed and simultaneously, illuminating light the speckle noise of which is reduced can be acquired by the compact and light luminaire.

What is claimed is:

1. An optical coherence reduction method, comprising:
providing a multimode light beam oscillated at plural different wavelengths;
branching said multimode light beam into branched plural light beams each having a fixed optical path length difference therebetween; and
forming said branched plural light beams into a single luminous flux or into collected luminous fluxes,
wherein when a degree of coherence of said multimode light beam is expressed as a function of time, the degree of coherence has periodically spaced maximum value waveforms in which a full width at a half maximum of a first maximum value waveform is $\tau_t$ and a center-to-center distance between the first maximum value waveform and a second next adjacent maximum value waveform is $\tau_d$, and the fixed optical path length difference L meets the following expression:

$$c[(n-1)\tau_d + \tau_t/2] \leq L \leq c[n\tau_d - \tau_t/2]$$

wherein c denotes light velocity in a medium in which the light is propagated and n denotes an arbitrary natural number.

2. The optical coherence reduction method according to claim 1, wherein m, an arbitrary natural number, times L and m times $c\tau_d$ are equal and m is equal to 3 or more.

3. An optical coherence reduction device, comprising:
a light source configured to provide a multimode light beam oscillated at plural different wavelengths; and an optical element configured to branch the multimode light beam into plural branched light beams, to apply a fixed optical path length difference to each of the plural branched light beams, and to then form said plural branched light beams into a single output luminous flux or an output made up of collected luminous fluxes, wherein when a degree of the coherence of said light beam is expressed as function of time, the degree of coherence as periodically spaced maximum value waveforms in which a full width at a half maximum of a first maximum value waveform is $\tau_t$ and a center-to-center distance between the first maximum value waveform and a second next adjacent maximum value waveform is $\tau_d$, and the fixed optical path length difference L meets the following expression:

$$c[(n-1)\tau_d+\tau_t/2] \leq L \leq c[n\tau_d-\tau_t/2]$$

wherein c denotes light velocity in a medium in which the light is propagated and n denotes an arbitrary natural number.

4. The optical coherence reduction device according to claim 3, wherein m, an arbitrary natural number times L and m times $c\tau_d$ are both equal and m is equal to 3 or more.

5. An optical coherence reduction device, comprising:
a light source configured to provide a multimode light beam oscillated at plural different wavelengths; and
an optical element configured to branch the multimode light beam into plural branched light beams, to apply a fixed optical path length difference to each of the plural branched light beams, and to then form said plural branched light beams into an output made up of collected luminous fluxes, wherein each of said plural branched light beams has an output end and each output end is arranged on a same surface to form the output of collected luminous fluxes and said same surface is an output surface of a semi-transparent member and said optical element is provided with a first reflecting surface on which the multimode light beam is incident, said first reflecting surface being configured to reflect said multimode beam to the semi-transparent member input surface, said semi-transparent member input surface being configured to cooperate with a second reflecting surface to apply said fixed optical path length difference to a portion of the multimode light beam being repeatedly reflected between said semi-transparent member input surface and the second reflecting surface with the semi-transparent member input surface passing a portion of the multimode light beam incident thereon at each repeated reflection to the output surface thereof so as to provide said plural branched light beams as a sequence of output beams from said semi-transparent member output surface.

6. An optical coherence reduction device, comprising:
a light source configured to provide a multimode light beam oscillated at plural different wavelengths; and
an optical element configured to branch the multimode light beam into plural branched light beams, to apply a fixed optical path length difference to each of the plural branched light beams, and to then form said plural branched light beams into a single output luminous flux, wherein each of said plural branched light beams has an output end and each output end is merged together to form said single output luminous flux with said optical element being configured as an optical fiber bundle in which plural optical fibers are each provided with said fixed optical path length difference between them so that the plural optical fibers are each different in length and are bundled together at least at a light receiving end and at a light output end.

7. An illuminating method, comprising:
emitting a multimode light beam from a coherent beam source, said multimode light beam oscillating at plural different wavelengths;
branching said multimode first light beam to form plural branched light beams;
applying a fixed optical path length difference to each of the plural branched light beams;
forming said plural branched light beams into a single output luminous flux or an output of collected luminous fluxes; and
providing said single output luminous flux or said output of collected luminous fluxes as a light beam for illumination,
wherein when a degree of coherence of said multimode light beam is expressed as a function of time, the degree of coherence has periodically spaced maximum value waveforms in which a full width at a half maximum of a first maximum value waveform is $\tau_t$ and a center-to-center distance between the first maximum value waveform and a second next adjacent maximum value waveform is $\tau_d$, and the fixed optical path length difference L meets the following expression:

$$c[(n-1)\tau_d+\tau_t/2] \leq L \leq c[n\tau_d-\tau_t/2]$$

wherein c denotes light velocity in a medium in which light is propagated and n denotes an arbitrary natural number.

8. The illuminating method according to claim 7, wherein m, an arbitrary natural number, times L and m times $c\tau_d$ are equal and m is equal to 3 or more.

9. A luminaire, comprising:
a coherent beam source configured to oscillate at plural different wavelengths and to emit a multimode light beam; and
an optical element configured to branch said multimode light beam into plural branched light beams, to apply a fixed optical path length difference to each of the plural branched optical beams, and to form said plural branched light beams into a single output illumination flux or an output of collected illumination fluxes,
wherein when a degree of coherence of said multimode light beam is expressed as a function of time, the degree of coherence has periodically spaced maximum value waveforms in which a full width at a half maximum of a first maximum value waveform is $\tau_t$ and a center-to-center distance between the first maximum value waveform and a second next adjacent maximum value waveform is $\tau_d$, and the fixed optical path length difference L meets the following expression:

$$c[(n-1)\tau_d+\tau_t/2] \leq L \leq c[n\tau_d-\tau_t/2]$$

wherein c denotes light velocity in a medium in which the light is propagated and n denotes an arbitrary natural number.

10. The luminaire according to claim 9, wherein m, an arbitrary natural number times L and m times $c\tau_d$ are both equal and m is equal to 3 or more.

11. A luminaire, comprising:

a coherent beam source configured to oscillate at plural different wavelengths and to emit a multimode light beam; and an optical element configured to branch said multimode light beam into plural branched light beams, to apply a fixed optical path length difference to each of the plural branched optical beams, and to form said plural branched light beams into an output of collected illumination fluxes, wherein each of said plural branched light beams has an output end and each output end is arranged on a same surface to form the output of collected illumination fluxes and said same surface is an output surface of a semi-transparent member and said optical element is provided with a first reflecting surface on which the multimode light beam is incident, said first reflecting surface being configured to reflect said multimode beam to a semi-transparent member input surface, said semi-transparent member input surface being configured to cooperate with a second reflecting surface to apply said fixed optical path length difference to portion of the multimode a light beam being repeatedly reflected between said semi-transparent member input surface and the second reflecting surface with the semitransparent member input surface passing a portion of the multimode light beam incident thereon at each repeated reflection to the output surface thereof so as to provide said plural branched light beams as a sequence of output beams from said semi-transparent member output surface.

12. A luminaire, comprising:

a coherent beam source configured to oscillate at plural different wavelengths and to emit a multimode light beam; and an optical element configured to branch said multimode light beam into plural branched light beams, to apply a fixed optical path length difference to each of the plural branched optical beams, and to form said plural branched light beams into a single output illumination flux, wherein each of said plural branched light beams has an output end and each output end is merged together to form said single output illumination flux with said optical element being configured as an optical fiber bundle in which plural optical fibers are each provided with said fixed optical path length difference between them so that the plural optical fibers are each different in length and are bundled together at least at a light receiving end and at a light output end.

* * * * *